(12) United States Patent
Nguyen et al.

(10) Patent No.: US 9,075,129 B2
(45) Date of Patent: Jul. 7, 2015

(54) METHOD AND SYSTEM FOR FORMING IMAGES BY COMPARING SUBSETS OF IMAGE DATA

(75) Inventors: Lam H Nguyen, Laurel, MD (US);
Thong T. Do, Beltsville, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 421 days.

(21) Appl. No.: 13/449,983

(22) Filed: Apr. 18, 2012

(65) Prior Publication Data

US 2012/0206293 A1    Aug. 16, 2012

Related U.S. Application Data

(63) Continuation-in-part of application No. 12/881,364, filed on Sep. 14, 2010, now Pat. No. 8,193,967, which is a continuation-in-part of application No. 12/331,888, filed on Dec. 10, 2008, now Pat. No. 7,796,829.

(51) Int. Cl.
| | |
|---|---|
| G01S 13/08 | (2006.01) |
| G01S 7/41 | (2006.01) |
| G01S 13/90 | (2006.01) |
| G01S 13/88 | (2006.01) |

(52) U.S. Cl.
CPC ............. G01S 7/414 (2013.01); *G01S 13/885* (2013.01); *G01S 13/887* (2013.01); G01S 13/90 (2013.01)

(58) Field of Classification Search
CPC ...... G01S 13/885; G01S 13/887; G01S 13/90
USPC .............................................................. 342/25
See application file for complete search history.

(56) References Cited

U.S. PATENT DOCUMENTS

| | | | |
|---|---|---|---|
| 5,262,789 A * | 11/1993 | Silverstein | ..................... 342/368 |
| 5,349,359 A | 9/1994 | Dallaire et al. | |
| 5,805,098 A | 9/1998 | McCorkle | |

(Continued)

OTHER PUBLICATIONS

Nguyen, Lam, "Signal and Image Processing Algorithms for the U.S. Army Research Laboratory Ultra-wideband (UWB) Synchronous Impulse Reconstruction (SIRE) Radar," ARL Technical Report ARL TR-4784.

(Continued)

*Primary Examiner* — Timothy A Brainard
(74) *Attorney, Agent, or Firm* — Lawrence E. Anderson

(57) ABSTRACT

A system and method for generating enhanced images of a target area using projection data obtained using an electromagnetic radiation source, the method comprising forming an initial aperture of data points containing positional information of the transmitter and receiver of the electromagnetic radiation; and an associated data record; randomly removing data points from the initial aperture to form subapertures with randomly missing data points; creating a subset of data points from each of the plurality of subapertures; the subsets containing data points containing image data for portions of the target area which are the same or overlapping; comparing the subsets of data points to determine variations in the data points indicative of transient data; based upon the comparison between overlapping subsets of image data, determining whether the subsets of data points comprise image data relating to physical objects or noise.

18 Claims, 12 Drawing Sheets
(6 of 12 Drawing Sheet(s) Filed in Color)

(56) References Cited

U.S. PATENT DOCUMENTS

| | | |
|---|---|---|
| 7,796,829 B2 | 9/2010 | Nguyen et al. |
| 7,961,134 B2 | 6/2011 | Ranney et al. |
| 8,193,967 B2 | 6/2012 | Nguyen |
| 8,502,731 B2 | 8/2013 | Martone et al. |
| 8,620,093 B2 | 12/2013 | Nguyen et al. |
| 8,624,773 B2 | 1/2014 | Nguyen et al. |
| 8,665,132 B2 | 3/2014 | Ranney |
| 8,824,544 B2 | 9/2014 | Nguyen et al. |
| 2012/0182171 A1 | 7/2012 | Martone et al. |
| 2012/0206293 A1 | 8/2012 | Nguyen et al. |
| 2013/0244710 A1 | 9/2013 | Nguyen et al. |
| 2014/0009324 A1 | 1/2014 | Ranney et al. |

OTHER PUBLICATIONS

McCorkle, John, et al., "Focusing of Dispersive Targets Using Synthetic Aperture Radar," ARL Technical Report ARL TR-305 (Aug. 1994).

Stolt, R.N. "Migration by Fourier Transform," Geophysics, 43, 1, (Feb. 1978).

Lam H. Nguyen, "SAR Image Formation by Pixel Classification (IF-PC)," Radar Conference (RADAR), 2011 IEEE, vol., No., pp. 315-319, May 23-27, 2011.

H. C. Stankwitz, R. J. Dallaire, J. R. Fienup, "Nonlinear Apodization for Sidelobe Control in SAR Imagery," IEEE Trans. on Aerospace and Electronic System, 31, 1, (Jan. 1995)).

Kuan, D.T., "Adaptive noise smoothing filter for images with signal dependant noise," IEEE Trans. Pattern Anal. Machine Intell., vol. PAMI-7, Mar. 1985.

Guo, H.; et al., "Wavelet based speckle reduction with application to SAR based ATD/R," Image Processing, 1994. Proceedings. ICIP-94., IEEE International Conference, vol. 1, No., pp. 75-79 vol. 1, Nov. 13-16, 1994.

D. L. Donoho, "Denoising by soft-thresholding," IEEE Trans. Inform.Theory, vol. 41, pp. 613-627, May 1995.

A. Buades, B. Coll, and J.M. Morel, "A Non- LocalAlgorithm for Image Denoising," Computer Vision and Pattern Recognition, 2005. CVPR 2005. IEEE Computer Society Conference on, vol. 2, 2005.

K. Dabov, A. Foi, V. Katkovnik, and K. Egiazarian, "Image denoising by sparse 3D transform-domain collaborative filtering," IEEE Transactions on Image Processing,vol. 16, No. 8, pp. 2080-2095, Aug. 2007.

Achim, A., et al. "SAR Image Denoising via Bayesian Wavelet Shrinkage Based on Heavy-Tailed Modeling," Geoscience and Remote Sensing,IEEE Transactions on, vol. 41, No. 8, pp. 1773-1784, Aug. 2003.

\* cited by examiner

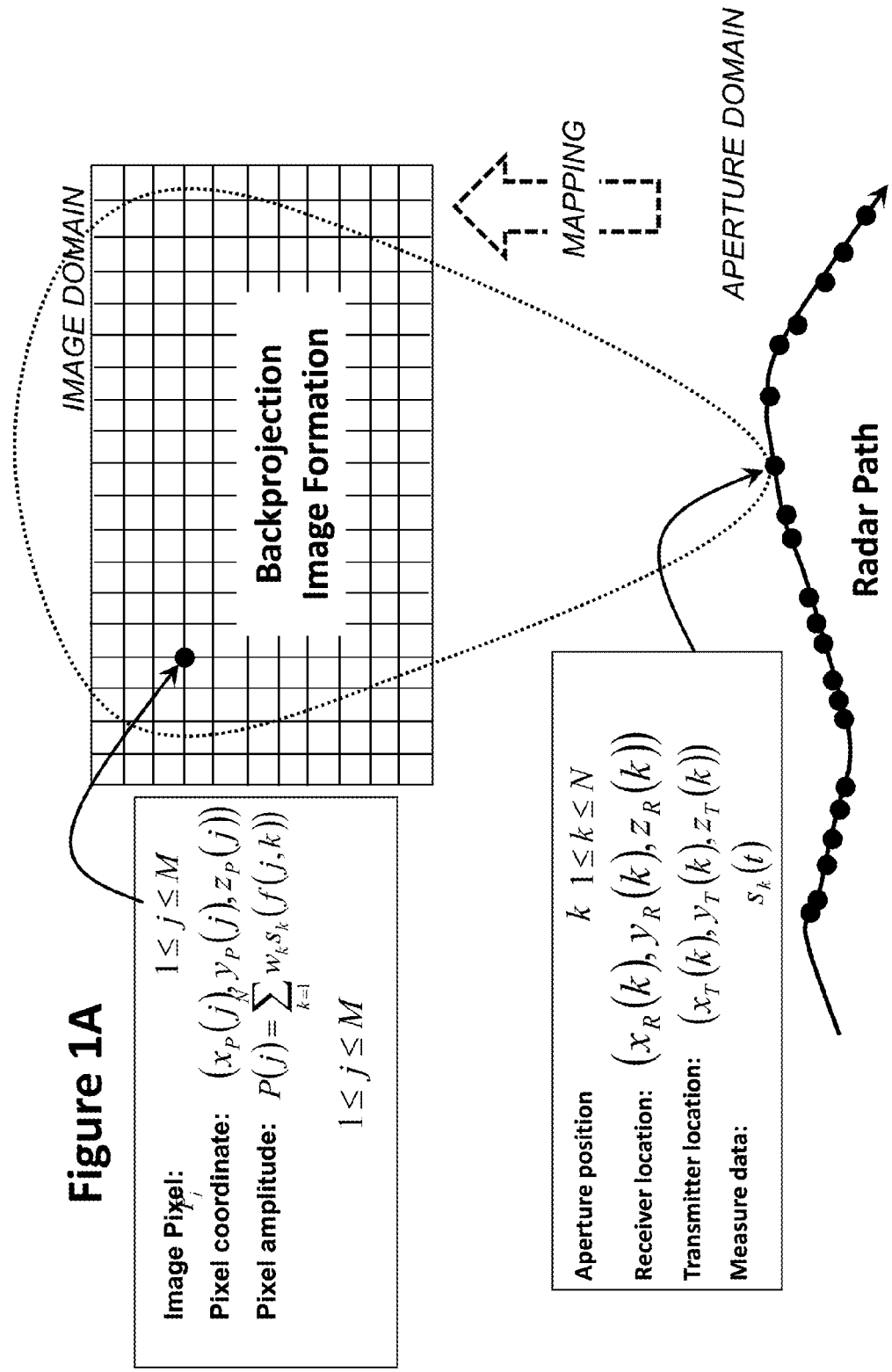

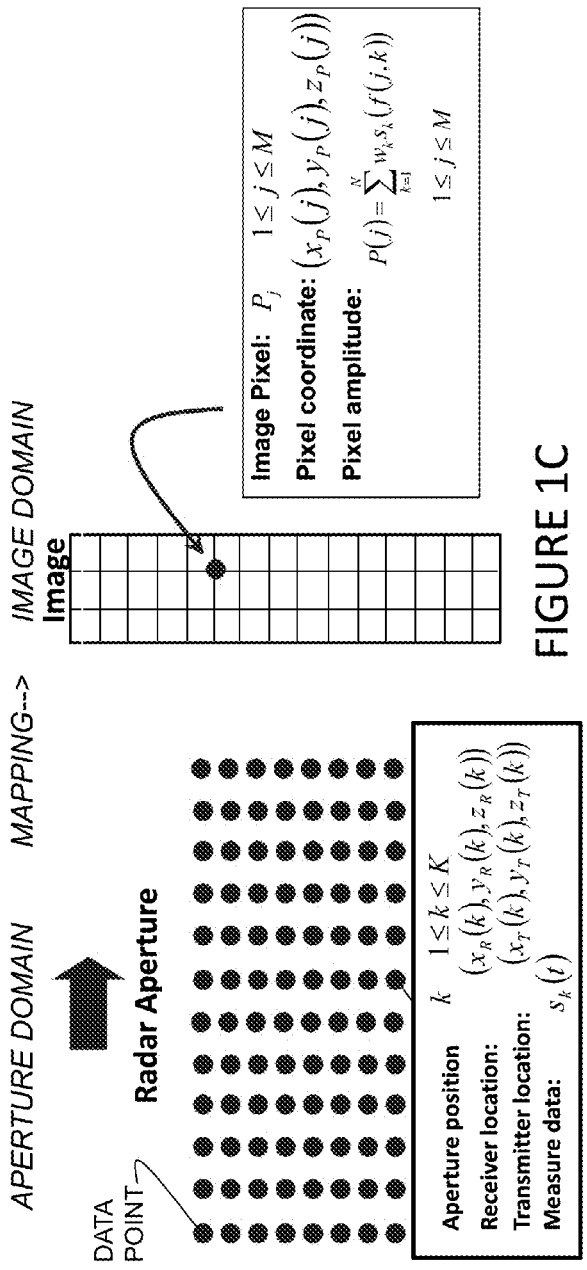
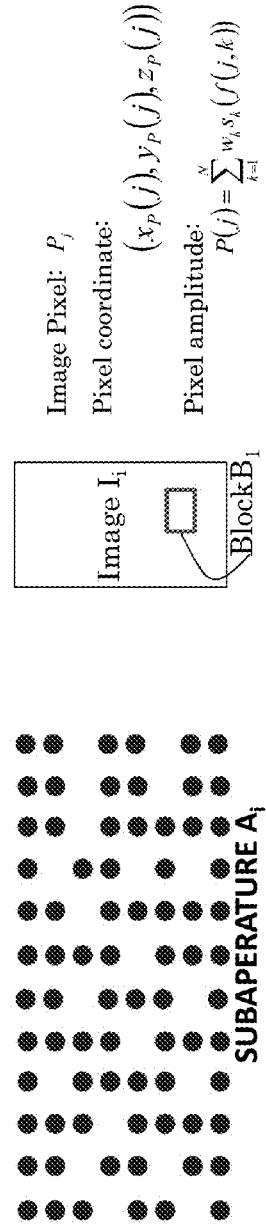
FIGURE 1C

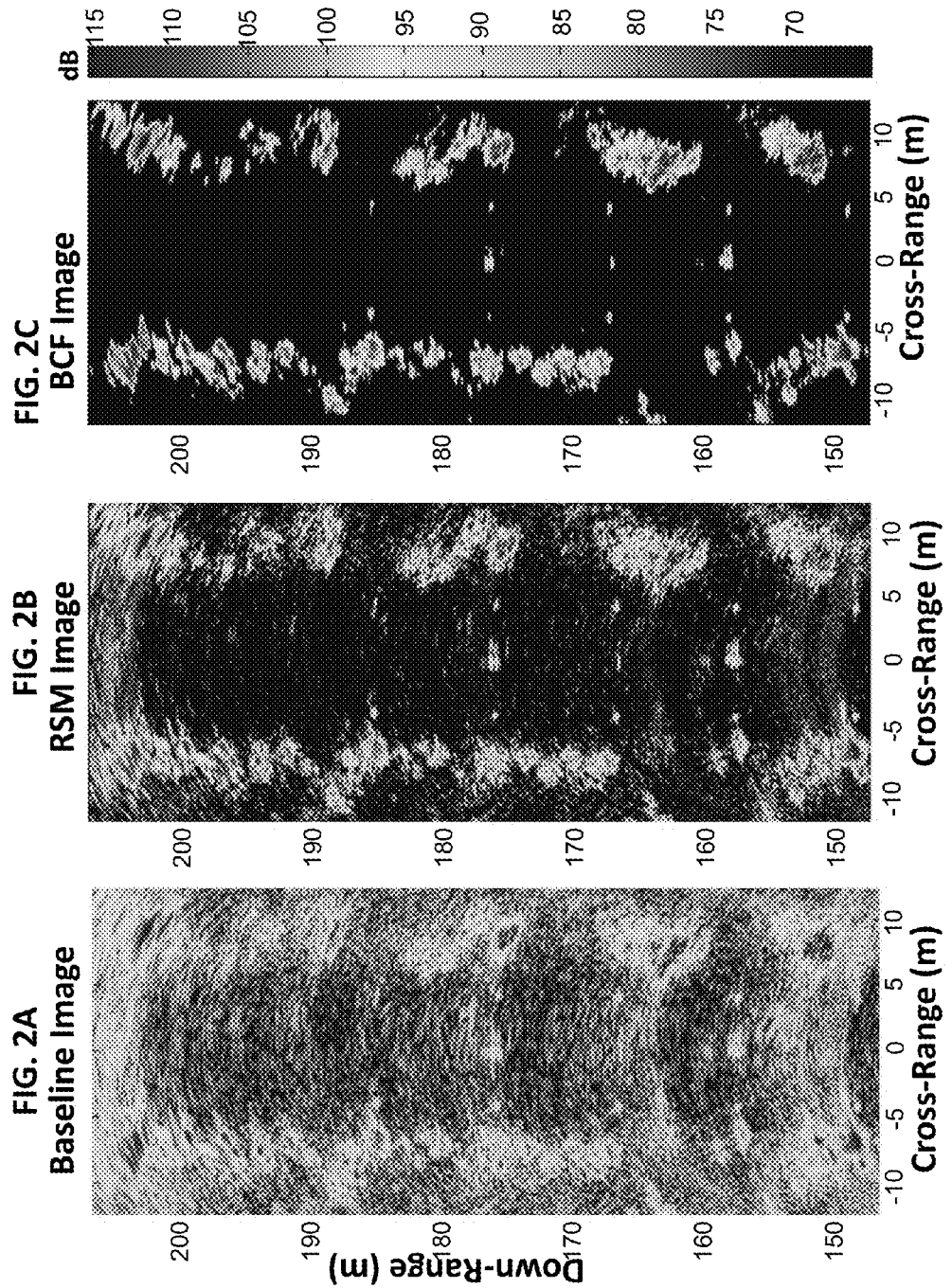

$C_j =$ [ $u_1$ $u_2$ ... $u_L$ ] [ $a_1$ $a_2$ ... $a_R$ ] [ $V_1^T$ $V_2^T$ ... $V_L^T$ ]

Collaboration matrix of vectorized blocks $B_1 - B_L$

Zeros complete remaining, unshown, positions of matrix

SINGULAR VALUE DECOMPOSITION

FIG. 10

METHOD AND SYSTEM FOR FORMING IMAGES BY COMPARING SUBSETS OF IMAGE DATA

CROSS-REFERENCE TO RELATED APPLICATIONS

This application is a continuation-in-part of and claims priority to U.S. patent application Ser. No. 12/881,364 entitled "METHOD AND SYSTEM FOR FORMING VERY LOW NOISE IMAGERY USING PIXEL CLASSIFICATION" (hereby incorporated by reference) by Lam Huy Nguyen and Jeffrey Sichina, filed Sep. 14, 2010, which is a continuation-in-part to U.S. patent application Ser. No. 12/331,888, filed on Dec. 10, 2008, by Lam Nguyen and Jeffrey Sichina, which is incorporated by reference herein, now U.S. Pat. No. 7,796,829, and to which priority is claimed.

STATEMENT OF GOVERNMENT INTEREST

The invention described herein may be manufactured, used, and licensed by or for the United States Government.

BACKGROUND OF THE INVENTION

The present invention relates to the generation of images from projection measurements. Examples of images-generated from projection measurements include two-dimensional and three-dimensional SAR (synthetic aperture radar) systems. SAR is a form of radar in which the large, highly-directional rotating antenna used by conventional radar is replaced with many low-directivity small stationary antennas scattered over some area near or around the target area. The many echo waveforms received at the different antenna positions are post-processed to resolve the target. SAR can be implemented by moving one or more antennas over relatively immobile targets, by placing multiple stationary antennas over a relatively large area, or combinations thereof. A further example of images generated from projection measurements are ISAR (inverse SAR) systems, which image objects and many features on the ground from satellites, aircraft, vehicles or any other moving platform. SAR and ISAR systems are used in detecting, locating and sometimes identifying ships, ground vehicles, mines, buried pipes, roadway faults, tunnels, leaking buried pipes, etc., as well as discovering and measuring geological features, forest features, mining volumes, etc., and general mapping. For example, as shown in FIG. 1 of U.S. Pat. No. 5,805,098 to McCorkle, hereby incorporated by reference, an aircraft mounted detector array is utilized to take ground radar measurements. Other examples of systems using projection measurements are fault inspection systems using acoustic imaging, submarine sonar for imaging underwater objects, seismic imaging system for tunnel detection, oil exploration, geological surveys, etc., and medical diagnostic tools such as sonograms, echocardiograms, x-ray CAT (computer-aided tomography) equipment and MRI (magnetic resonance imaging) equipment.

Synthetic aperture radar (SAR) systems have been used in many applications to provide area mapping, surveillance, and target detection. The radar is usually mounted on an aircraft or a ground-based vehicle configured with transmitting and receiving antennas to transmit and measure the reflected radar signals from the areas of interest. Through signal processing, the reflected radar signals collected along the flight path are combined to form the SAR image for the area along one side (side-looking mode) or in front of the radar (forward-looking mode).

There is a major challenge that SAR (or other imaging systems) must face. The resulting imagery is contaminated with 1) system noise (due to system components), 2) interference noise (due to internal and external sources), and 3) sidelobes from large targets. The first two types are additive noise and the last type (sidelobes) is multiplicative noise. These sources result in a high noise floor level in SAR imagery and reduce the ability of the radar system to detect small targets, especially if these targets are located in the proximity of larger objects (natural or manmade). For other systems such as medical imaging systems, the detection of small targets (subtle features, tumors) in the presence of noise and other large objects is also a big challenge.

There have been numerous techniques that have been developed to suppress the additive noise. Suppression of the multiplicative noise is a much more challenging task since the noise level (sidelobes) is proportional to the size (radar-cross-section) of the in-scene targets. Conventional shift-invariant windows have been used to reduce or suppress the sidelobe artifacts at the expense of resolution and a reduced signal-to-noise ratio (SNR). A family of spatially variant apodization techniques has been developed to address the sidelobes problem. These spatially variant apodization techniques generate nonlinear imagery (the phase information is not preserved in the resulting imagery). In U.S. Pat. No. 7,796,829, entitled "Method and System for Forming an Image with Enhanced Contrast and/or Reduced Noise" a nonlinear imaging technique called Recursive Sidelobe Minimization (RSM) was disclosed that significantly reduces the noise, level in real SAR imagery by 5☐10 dB. More recently; ARL invented another method, Image Formation by Pixel Classification (IF-PC), which significantly improves the suppression of the noise level over Recursive Sidelobe Minimization mage Formation by Pixel Classification achieves state-of-the-art performance that generates virtually noise-free imagery. The key idea of Image Formation by Pixel Classification is to classify each pixel of a sequence of subaperture SAR images into a real object class or a noise class based on a magnitude of the pixel's normalized standard deviation. If the normalized standard deviation is larger than a threshold, the pixel is classified into the noise class. Otherwise, the pixel is classified into the target class. Despite its superior performance in noise suppression, Image Formation by Pixel Classification still has two important features that could be further improved. First, the Image Formation by Pixel Classification technique is still based on a nonlinear signal processing technique.

The pixel classification process (real object/noise) is computed using magnitude data, and thus, the results are also magnitude imagery. This type of imagery is appropriate for applications that only require magnitude information. However, the complex imagery contains much more information (phase and frequency response), which may be the key for target discrimination and classification. Although the target/noise classification information from Image Formation by Pixel Classification could be employed in conjunction with the baseline complex imagery to derive the noise reduced complex imagery, this indirect operation could result in the discontinuity in the complex imagery. Second, the pixel classification process in Image Formation by Pixel Classification depends on the statistics of a single pixel across multiple iterations, thus does not capture the local spatial correlation across many pixels from the same object.

Back Projection of SAR Image

Systems which produce images from projection data generally use techniques in the time domain, where a backprojection-type algorithm is used, or frequency domain, where Fourier transforms are used. For example, time domain backprojection-based techniques have been used for numerous applications, including x-ray CAT scans, MRI and sonograms. Historically, medical people have preferred backprojection because its artifact levels were lower than those using fast Fourier transform (FFT) approaches.

Synthetic aperture radar systems have been used in applications such as area mapping, surveillance, and target detection. The radar is usually mounted on an aircraft or a vehicle configured with transmitting and receiving antennas to transmit and measure the reflected radar signals from areas of interest. Through signal processing, the reflected radar signals along the flight path are combined to form the SAR imaging for side looking or forward looking surveillance.

SAR imaging is complex for a variety of reasons. First, the data is not inputted at equally distant (or known) points. Instead, data may be inputted in a non-uniform manner from an aircraft that is buffeted by the wind or from a ground vehicle that traverses rough ground. Therefore, motion compensation must be introduced in order to produce sharp images. Second, the subject objects need not be point sources but may be dispersive—where energy is stored and "re-radiated" over time. Ground penetrating SAR adds the complication that the media propagation velocity varies which complicates seismic processing. For many SAR applications, especially for high-resolution, ultra-wide-angle (UWA), ultra-wide-bandwidth (UWB) surveillance systems, the task is particularly problematic because the data sets are large, real-time operation is essential, and the aperture geometry is not controlled. For example, small aircraft buffeted by the wind can affect SAR data due to significant off-track motion and velocity changes. As a result, the data is not sampled at equally spaced intervals.

Backprojection techniques provide many advantages; including sharper images. Although prior art backprojector implementations may generate image artifacts; they are constrained to be local to the object generating the artifacts and generally lie within the theoretical sidelobes. Side lobes are the lobes of the radiation pattern that are not the main beam or lobe. In an antenna radiation pattern or beam pattern, the power density in the side lobes is generally much less than that in the main beam. It is generally desirable to minimize the sidelobe level (SLL), commonly measured in decibels relative to the peak of the main beam. The concepts of main and side lobes apply to (but are not limited to) for example, radar and optics (two specific applications of electromagnetics) and sonar. The present invention is directed to techniques which minimize the effects of theoretical sidelobes in order to provide enhanced images.

Backprojector techniques also allow for non-uniform spacing of the projection data. The non-uniform spacing is directly accounted for in the index generation, which is important when compensating for aircraft motion.

Conventional time domain image formation, or backprojection, from SAR data, is accomplished by coherently summing the sampled radar returns for each pixel. In this context, coherent summation can be thought of as time-shifting the signal obtained at each aperture position (to align them to a particular pixel) and adding across all aperture, positions to integrate the value at that pixel. This time-align-and-sum sequence is repeated for every pixel in the image.

A method and system for forming images by backprojection is explained in U.S. Pat. No. 5,805,098 to McCorkle, hereby incorporated by reference as though fully rewritten herein.

FIG. 1A illustrates an example utilizing the basic concept of the backprojection imaging algorithm. The radar is mounted on a moving platform. It transmits radar signals to illuminate the area of interest and receives, return signals from the area. Using the motion of the platform, the radar collects K data records along its path (or aperture). In general the aperture could be a line, a curve, a circle, or any arbitrary shape. The receiving element k from the aperture is located at the coordinate $(x_p(j), y_p(j), z_p(j))$. For bistatic radar (the transmitting antenna is separate; from the receiving antenna) the transmitting element k from the aperture is located at the coordinate $(x_T(k), y_T(k), z_T(k))$. For monostatic radar (the transmitting antenna is the same as or co-located with the receiving antenna) the transmitting coordinates $(x_T(k), y_T(k), z_T(k))$ would be the same as the receiving coordinates $(x_R(k), y_R(k), z_R(k))$. Since the monostatic radar case is a special case of the bistatic radar configuration, the algorithm described here is applicable for both configurations. The returned radar signal at this receiving element k is $s_k(t)$. In order to form an image from the area of interest, we form an imaging grid that consists of N image pixels. Each pixel $P_i$ from the imaging grid is located at coordinate $(x_p(j), y_p(j), z_p(j))$. The imaging grid is usually defined as a 2-D rectangular shape. In general, however, the image grid could be arbitrary. For example, a 3-D imaging grid would be formed for, ground penetration radar to detect targets and structures buried underground. Another example is 3-D image of inside human body. Each measured range profile $s_k(t)$ is corrected for the $R^2$ propagation loss, i.e. $s_k'(t) = R^2(t)s_k(t)$, where $$R(t) = \frac{ct}{2}$$

and $c=2.997\ e^8$ m/sec. The backprojection value at pixel P(i) is $$P(j) = \sum_{k=1}^{K} w_k s_k'(f(j,k)), \ 1 \le j \le M \quad (1)$$

where $w_k$ is the weight factor and $f(j,k)$ is the delay index to $s_k(t)$ necessary to coherently integrate the value for pixel P(i) from the measured data at receiving element k.

The index is computed using the round-trip distance between the transmitting element, the image (pixel), and the receiving element. The transmitting element is located at the coordinate $(x_T(k), y_T(k), z_T(k))$. The distance between the transmitting element and the image pixel P(i) is:

$$d_1(i,k) = \sqrt{[(x_T(k)-x_p(i))]^2 + [(y_T(k)-y_p(i))]^2 + [(z_T(k)-z_p(i))]^2} \quad (2)$$

The distance between the receiving element and the image pixel P(i) is $$d_2(i,k) = \sqrt{[(x_R(k)-x_p(i))]^2 + [(y_R(k)-y_p(i))]^2 + [(z_R(k)-z_p(i))]^2} \quad (3)$$

The total distance is $$d(i,k) = d_1(i,k) + d_2(i,k) \quad (4)$$

The delay index is $$f(i,k) = \frac{d(i,k)}{c} \quad (5)$$

FIG. 1B illustrates a typical imaging geometry for an ultra wide band forward looking (e.g., SIRE) radar. In this case, the radar is configured in forward-looking mode instead of side-looking mode as illustrated in FIG. 1A. In this forward-looking mode, the radar travels and radiates energy in the same direction. The general backprojection algorithm described above applies to the embodiment of FIG. 1B. As seen in FIG. 1B, the radar travels in parallel to the x-axis. The backprojection image formation is combined with the mosaic technique. The large area image is divided into sub-images. The size of each sub-image may be, for example, 25 m in cross-range and only 2 m in down-range (x-axis direction). The radar starts at coordinate A, which is 20 m from sub-image 1, and illuminates the entire image area to the right.

The following is a description of the platform 10 in FIG. 1B as it passes four sequential positions $10^A$, $10^B$ $10^C$ & $10^D$ located at x-coordinates A, B, C & D, respectively. The formation of the first sub-image begins when platform 10 is at the coordinate A, 20 meters from the block labeled "$1^{st}$ sub-image." As platform 10 travels in the x direction (as shown in FIG. 1B), signals emitted from platform 10 illuminates an entire image area to the right of platform 10, and the reflected signals are received by an array of 16 physical receiving antennas 11 positioned, on the front of the platform 10. Formation of the first sub-image ends when platform 10 reaches coordinate C, at approximately 8 m from the block labeled "$1^{st}$ sub-image." Accordingly, the radar signal data for the first (full-resolution) sub-image is received, as radar platform 10 travels a distance of 12 meters (20 m−8 m=12 m) from coordinates A to C, for formation of a two dimensional (2D) aperture.

The distance traveled during the formation of the two-dimensional (2-D) aperture is represented by an arrow in FIG. 1B labeled "Aperture 1." When the platform 10 reaches coordinate B, a distance of 2 meters from coordinate A in FIG. 1B, the formation of the "$2^{nd}$ sub-image" begins and as the platform 10 travels to coordinate D, it uses the received data to form a second 2-D aperture. The distance traveled by platform 10 is represented by an arrow in FIG. 1B labeled "Aperture 2." Note that the two apertures are overlapped by 10 m and the second aperture is "advanced" by 2 m with respect to the first aperture. Sub-images 1 and 2 are formed from the 2-D apertures using the same length of travel (12 meters) of the radar. This process is applied to ensure that image pixels have almost the same (within a specified tolerance) resolution across the entire large area. The sub-images are formed from the radar range profiles using the back-projection algorithm.

The term "noise" as used herein relates to image noise. There are many sources that cause noise in the resulting image. Noise can be divided into two categories additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets with smaller amplitudes.

BRIEF SUMMARY OF THE INVENTION

A preferred embodiment imaging technique computes the resulting imagery by using, for example, complex bipolar SAR imagery data. The preferred embodiment utilizes the classification of collaborative filtering of overlapping blocks of pixels from many realizable randomly reduced aperture SAR images. These blocks are first classified into either target class (physical objects) or non-target class (noise, sidelobes) based on statistics of singular values of a constructed collaboration matrix. If a block of pixels is classified to be associated with a physical object, its value is computed from the largest singular-value of the constructed collaboration matrix and its associated singular vectors. Otherwise the block is assumed to come from a non-physical object (noise source) and its value is simply zero. The techniques can be used to suppress both types of noise: additive and multiplicative, and may be utilized to generate bipolar complex SAR imagery that is substantially noise-free.

A block of pixels may be classified into either target class (physical objects) or non-target class (noise, sidelobes) based on statistics of singular values of the constructed collaboration matrix. If a block of pixels is classified to be associated with a physical object, its value is computed from the largest singular value of the constructed collaboration matrix and its associated singular vectors. Otherwise, the block is assumed to come from a non-physical object (noise source) and its value is simply zeroed out.

A preferred methodology comprises a method for generating enhanced images of a target-area using projection data obtained using an electromagnetic radiation source, the method comprising forming an initial aperture of data points, containing positional information of the transmitter and receiver of the electromagnetic radiation; and an associated data record; randomly removing data points from the initial aperture to form subapertures with randomly missing data points; creating a subset of data points from each of the plurality of subapertures; the subsets containing data points containing image data for portions of the target area which are the same or overlapping; comparing the subsets, of data points to determine variations in the data points indicative of transient data; based upon the comparison between overlapping subsets of image data, determining whether the subsets of data points comprise image data relating to physical objects or noise.

A preferred embodiment comprises a system for generating enhanced images of a target area using projection data obtained using an electromagnetic radiation source, the system comprising at least one processor, the at least one processor having at least one input for inputting the projection data and at least one output for outputting enhanced image data, the at least one processor operating to perform the following: forming an initial aperture of data points containing positional information of the transmitter and receiver of the electromagnetic radiation; and an associated data record; randomly removing data points from the initial aperture to form subapertures with randomly missing data points; creating a subset of data points from each of the plurality of subapertures; the subsets containing data points containing image data for portions of the target area which are the same or overlapping; comparing the subsets of data points to determine variations in the data points indicative of transient data; based-upon the comparison between overlapping subsets of image data, determining whether the subsets of data points comprise image data relating to physical objects or noise.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given, by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

FIG. 1A is a schematic diagram of a generalized conventional technique for image projection.

FIG. 1C illustrates schematically how Back-projection image formation is applied for each sub-image.

FIG. 2A illustrates an image example utilizing the baseline SAR imagery using data from the ARL low-frequency ultrawideband (UWB) SAR radar.

FIG. 2B illustrates the same SAR image as FIG. 1A with the application of ARL Recursive Sidelobe Minimization technique; clearly having a much higher SNR (10 dB) due to the application of the RECURSIVE SIDELOBE MINIMIZATION technique. Note that although the Recursive Sidelobe Minimization technique significantly suppresses the noise level, its resulting image includes only amplitude information.

FIG. 2C illustrates the same SAR image as FIG. 2A with the application of the preferred embodiment block-based collaborative filtering technique; which generates SAR imagery with both amplitude and phase information that contains key features for target detection and discrimination.

FIG. 10 is a schematic illustration of the collaborative matrix and the use of the singular value decomposition method.

DETAILED DESCRIPTION OF PREFERRED EMBODIMENT

Figure 1B:
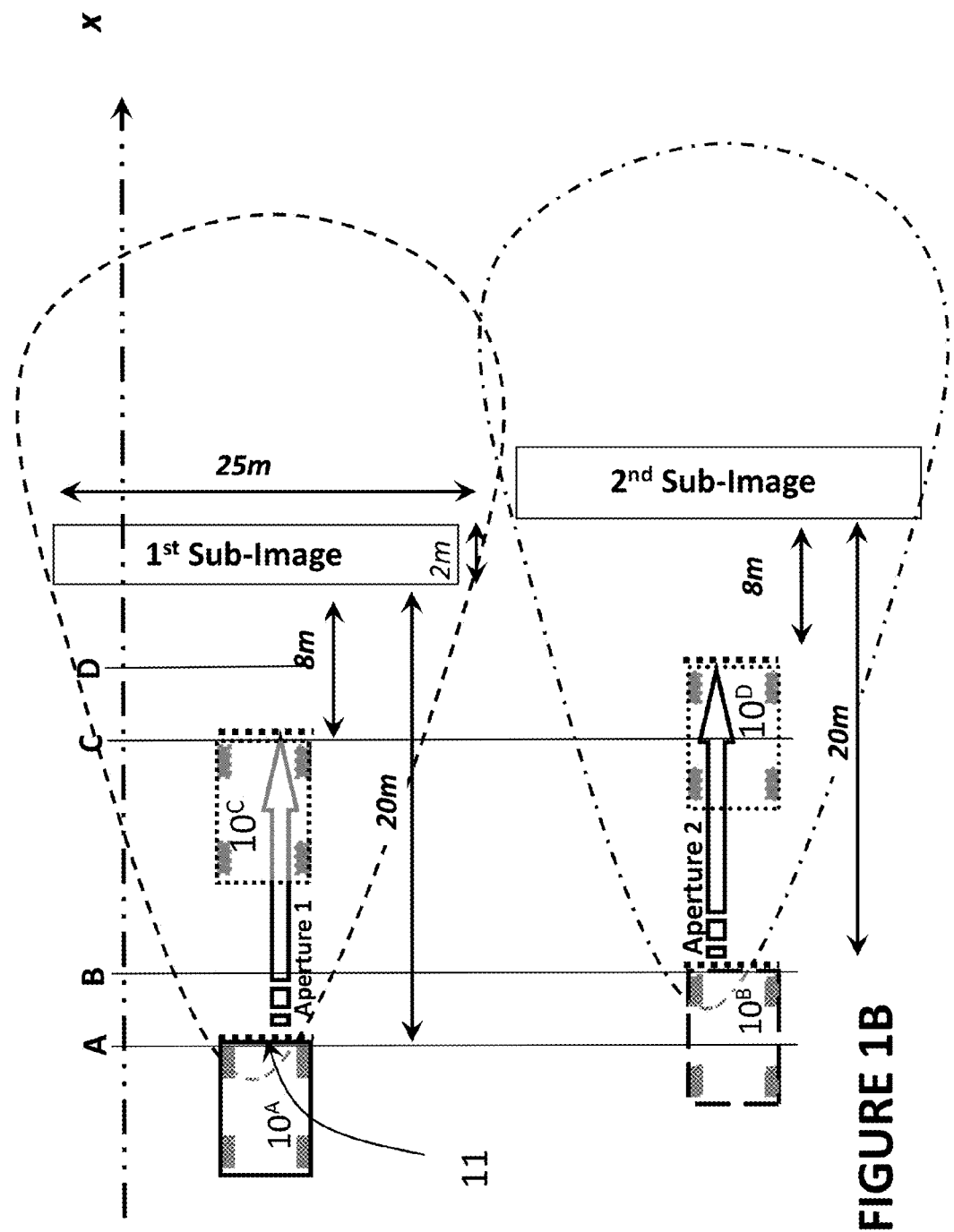
FIG. 1B is a schematic diagram of ultra wide band (UWB) forward looking radar imaging geometry and Mosaic imaging.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not, unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus; a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention enables the generation of very high contrast images with greatly enhanced performance. The resulting benefits are: a) high contrast image with the significant reduction in the noise level, b) detection of targets with very small amplitudes, and c) the reduction in the false alarm rate. Such benefits result in a substantially improved practical system for detecting difficult targets, which is an obstacle that most radar systems are facing today.

Disclosed in now U.S. Pat. No. 7,796,829 ('829 Patent) (hereby incorporated by reference) is a non-linear imaging algorithm that significantly improves the background noise level of the resulting image without negatively affecting the focus quality (sharpness) as well as the target amplitudes. In the '829 Patent, this technique has been denominated as Recursive Sidelobe Minimization (RSM).

As disclosed in U.S. patent application Ser. No. 12/881,364 (hereby incorporated by reference) entitled "Method and System for Forming Very Low Noise Imagery Using Pixel Classification" (hereby incorporated by reference) by Lam Huy Nguyen, the classification of pixels is based upon the concept that noise is transitory. Since most of the pixels in the image are classified as non-targets, this would generate a very low noise floor in the resulting SAR image. The remaining pixels are classified as targets. Each of these pixels will have the maximum value across many iterations. Thus, the technique virtually wipes out the noise floor that includes the sidelobes, and maximizes the responses from the targets. The decision statistic described) to classify a pixel is the standard deviation of the pixel amplitudes across all iterations, and normalized by its mean amplitude.

Figure 4:
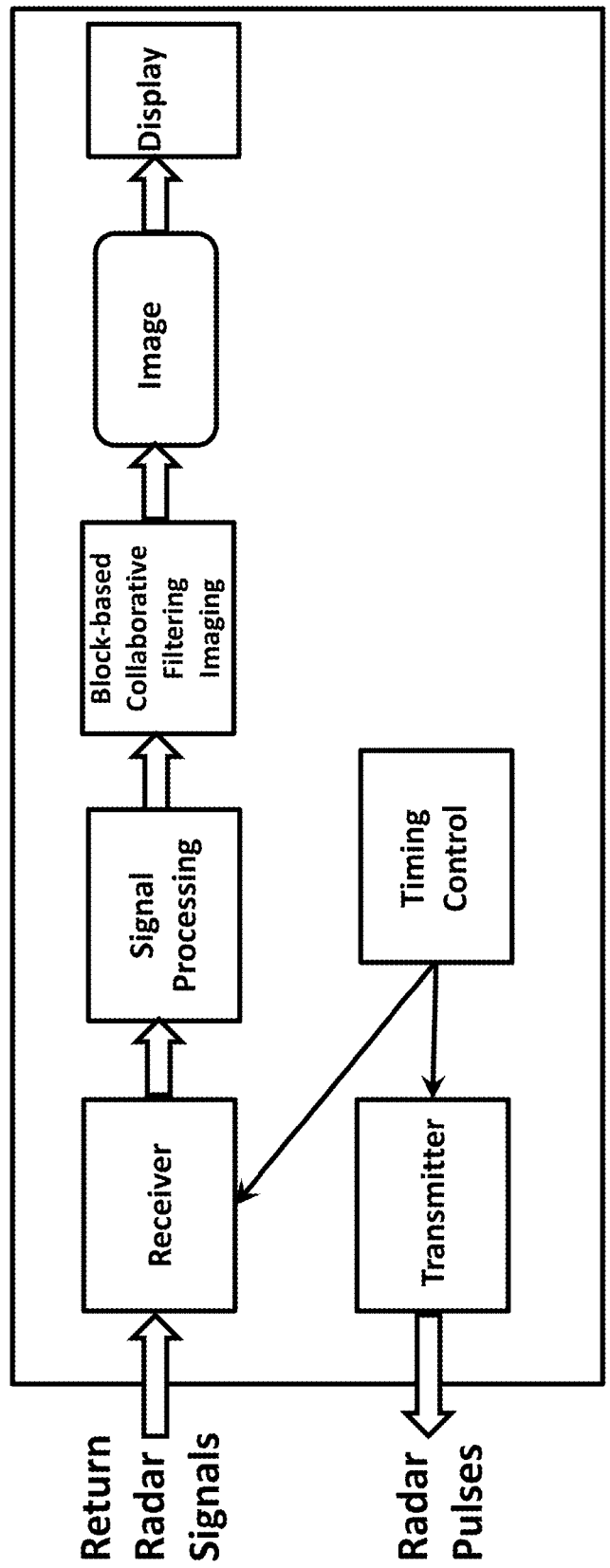
FIG. 4 is a schematic illustration of the overall SAR system block diagram.
Figure 5:
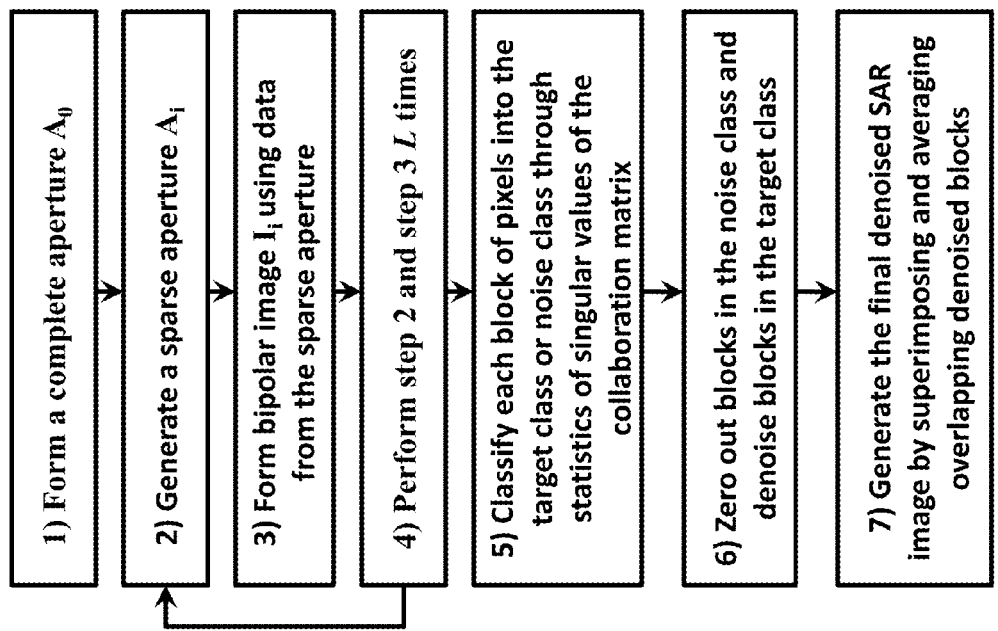
FIG. 5 is a schematic block diagram showing the processing steps of the Block Based Collaborative Filtering technique that is performed by the SAR imaging subsystem.

FIG. 1A shows an imaging scenario. The radar is mounted on a vehicle (ground-based or airborne). The radar moves along a path that is formed by the motion of the vehicle. Along the vehicle path, the radar transmits signals to illuminate the area of interest, captures the return radar data and its position data, and combines the data to form the SAR image of the area. Although FIG. 1A illustrates the radar system that is configured in side-looking mode, the concept of operation is the same for the forward-looking or any other configuration modes. Reference entitled Nguyen, Lam, "Signal and Image Processing Algorithms for the U.S. Army Research Laboratory Ultra-wideband (UWB) Synchronous Impulse Reconstruction (SIRE) Radar," ARL Technical Report ARL TR-4784, describes the ARL radar operations and processing steps in both side-looking mode and forward-looking mode. FIG. 4 shows the overall SAR system block diagram. The return radar signals are first sent to the signal processing subsystem, where a series of signal processing algorithms are performed to suppress some of the additive noise from the radar data. After the signal processing steps, the processed radar data are sent to the IF-PC imaging subsystem that combines the radar and the position data to form the SAR imagery. The image formation process typically employs standard imaging techniques such as the backprojection algorithm, as described in McCorkle, John, et al., "Focusing of Dispersive Targets Using Synthetic Aperture Radar," ARL Technical Report ARL TR-305 (August 1994) (hereby incorporated by reference) or the range migration algorithm as described in Stolt, R. H. "Migration by Fourier Transform," Geophysics, 43, 1, (February 1978) pages 23-48 (hereby incorporated by reference). As mentioned previously, although the signal processing steps have performed the suppression of unwanted noise from the return radar data, and the imaging process also provides additional signal-to-noise gain by coherently integrate radar data from many aperture positions, the noise floor in the resulting image is still a major challenge for the detection of smaller targets, especially if these targets are located in the proximity of the sidelobes of the larger objects. Block Based Collaborative Filtering generates almost noise-free SAR imagery. FIG. 5 shows the processing steps of the Block Based Collaborative Filtering technique, that is performed by the SAR imaging subsystem.

STEP 1—Form the complete aperture $A_0$.

In this step, the system collects the return radar data, the coordinates of the receiver, and the coordinates of the transmitter for each position k along the aperture of N positions.

The radar data at each position is $$s_k(t), 1 \leq k \leq N. \quad (1)$$

The coordinates of the receiver at each position is $$(x_R(k), y_R(k), z_R(k)), 1 \leq k \leq N. \quad (2)$$

The coordinates of the transmitter at each position is $$(x_r(k), y_r(k), z_r(k)), 1 \leq k \leq N. \quad (3)$$

For monostatic radar that uses the same transmitting and receiving antenna, the coordinates of the receivers ($x_R(k)$, $y_r(k)$, $z_r(k)$) are identical to the coordinates of the transmitters ($x_r(k)$, $y_r(k)$, $z_r(k)$). Since the monostatic radar case is at special case of the bistatic radar configuration, the algorithm described here is applicable for both configurations.

STEP 2—From the complete aperture of N positions $A_0$ generated from step 1, generate a randomly reduced aperture $$A_i, 1 \leq i \leq L, \quad (4)$$

where L is the number of iterations that the algorithm computes.

The randomly reduced aperture $A_i$ is a subset of the complete aperture $A_0$. This randomly reduced aperture only consists of K positions that are randomly selected from N positions in $A_0$, where K=p·N and 0<p<1. The typical value for p=0.8. In this example the value of p=0.8 means that instead of using all of the positions from aperture $A_0$ for imaging, only 80% of the aperture positions are employed during the imaging process for this iteration. The selection of K positions from N positions should be completely random, since this step is only one out of L iterations that the block-based, collaborative filtering technique will perform.

One approach to implement this sparse aperture is to generate a random vector for this $i^{th}$ iteration:

$$w_{ik}, 1 \leq k \leq N \quad (5)$$

where the value of $w_{ik}$ is either 0 or 1. There are K elements of $w_{ik}$ having the value of 1, and (N−K) elements of $w_{ik}$ having the value of 0.

STEP 3—Formation of a complex bipolar image $I_i$ using data from the sparse aperture $A_i$ (from step 3) and the backprojection algorithm as described in John McCorkle, Lam Nguyen, "Focusing of Dispersive Targets Using Synthetic Aperture Radar," original ARL-TR-305 August 1994, reprinted March 2010.

In order to form an image from the area of interest, we generate an imaging grid that consists of M image pixels. Each pixel from the imaging grid is located at coordinates $$(x_P(j), y_P(j), z_P(j)), 1 \leq j \leq M \quad (6)$$

The imaging grid is usually defined as a 2-D or 3-D rectangular shape. In general, however, the image grid could be arbitrary.

The backprojection value at $j^{th}$ pixel is computed as $$P_{ij} = \frac{\sum_{k=1}^{N} w_{ik} s_k(f(k,j))}{\sum_{k=1}^{N} w_{ik}}, 1 \leq j \leq M \quad (7)$$

where $P_{ij}$ is the value of $j^{th}$ pixel formed using the sparse aperture $A_i$.

In equation (7), by assigning the value of $w_{ik}$ to be either 0 or 1, the weighting factors $W_{ik}$ define which aperture positions contribute to the formed image. From equation (7), although the summation is performed from 1 to N only data from K aperture positions are contributed to the final value of the image pixel since $w_{ik}$ generated from equation (7) only contains K non-zero elements. Also note that the value of the denominator $$\sum_{k=1}^{N} w_{ik}$$

in equation (7) represents the number of non-zero elements. This value is used as normalization factor for the final image pixel value.

The delay (shift) index f(k,j) in equation (7) is computed based on the round-trip distance between the transmitting element, the image pixel, and the receiving element.

The distance between the $k^{th}$ transmitting element and the $j^{th}$ image pixel is $$d_1(k,j) = \sqrt{[x_T(k)-x_P(j)]^2 + [y_T(k)-y_P(j)]^2 + [z_T(k)-z_P(j)]^2} \quad (8)$$

The distance between the $k^{th}$ receiving element and the $j^{th}$ image pixel is $$d_2(k,j) = \sqrt{[x_R(k)-x_P(j)]^2 + [y_R(k)-y_P(j)]^2 + [z_R(k)-z_P(j)]^2} \quad (9)$$

The round trip distance is $$d(k,j) = d_1(k,j) + d_2(k,j) \quad (10)$$

The delay index is $$f(k,j) = \frac{d(k,j)}{c} \quad (11)$$

The bipolar image, which includes both amplitude and phase information, using the data from the sparse aperture $A_i$ is computed as $$I_i = \langle P_{ij} \rangle \quad (12)$$

STEP 4—Repeat steps 2 and 3 for L iterations ($1 \leq i \leq L$) to generate L SAR image realizations $I_i$ (i=1, 2, ..., L).

For each (overlapping) block, form a corresponding; collective matrix C and then compute the following decision statistic that is the ratio between the largest and the second largest singular values of the matrix C:

$$d_C = \frac{\alpha_1}{\alpha_2} \quad (13)$$

If $d_C \geq \eta$, where $\eta$ is some threshold, the block is classified to be associated with a target class. Otherwise, the block is classified to be associated with a noise class and as a result, its pixel value is set to be zero.

If a block is classified to be associated with a target class, the best rank-1 approximation of the matrix C is first computed as $$C_1 = \alpha_1 u_1 v_1^T \quad (14)$$

A noise-reduced version of the current block is computed as the first column of matrix $C_1$. Note that matrix $C_1$ has rank 1, and hence, all its columns are the same within a scaling factor.

Finally, a noise-reduced SAR image is computed by averaging these overlapping noise-reduced blocks.

Simulation Data

Simulation data was used to illustrate the basic concept of SAR imaging in order to provide the insights why the block-based collaborative filtering technique works so well at removing the noise floor.

A simulation data set was generated using a following scenario. The radar travels along a linear path, transmits impulse signals to the side of the vehicle (perpendicular to the path of the vehicle), and captures the return data. Along the path, the radar also records its coordinates at every transmit/receive cycle. The coordinate measurement also introduces errors in the measurement data. There are four point targets in the scene. The data received by the radar are contaminated with additive white noise from radio frequency interference (RFI) sources external to the system.

Figure 6:
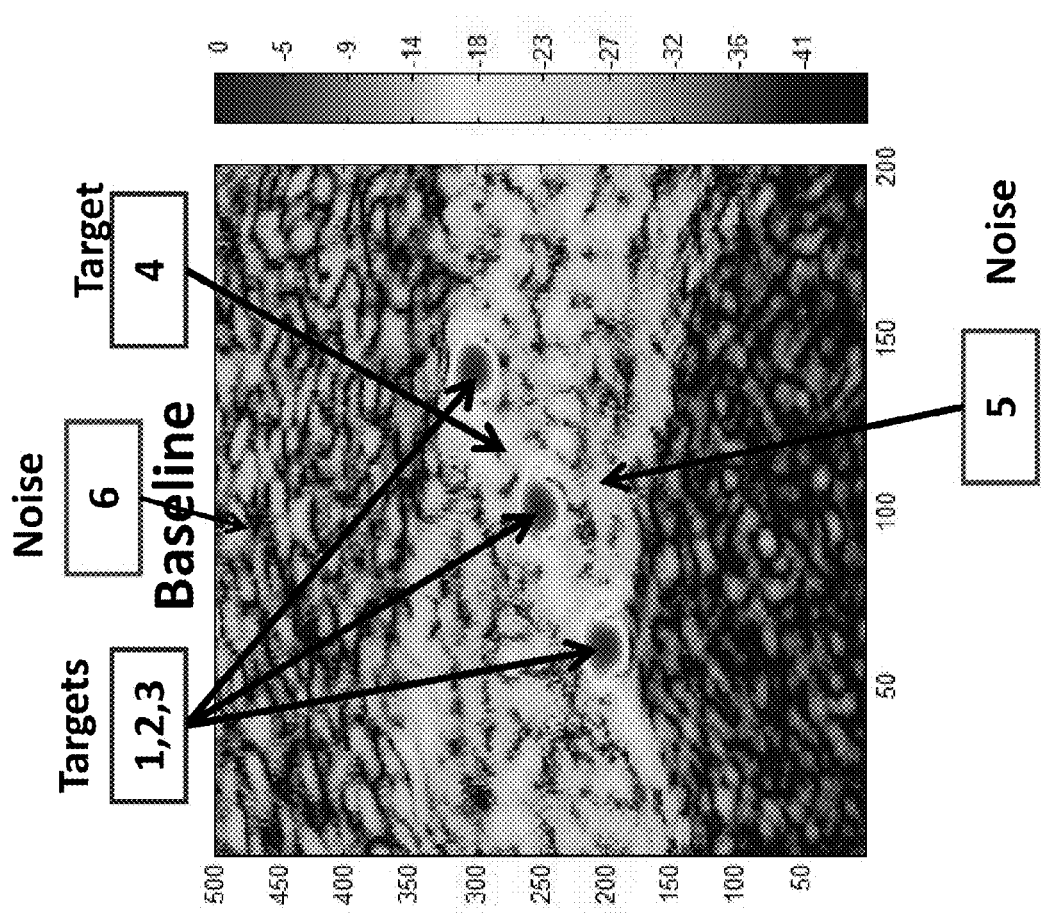
FIG. 6 is an illustration of a SAR image generated from the return data using the standard backprojection image formation algorithm.

FIG. 6 shows a SAR image generated from the return data using the standard backprojection image formation algorithm. Although the SAR image formation improves the SNR by the integration across the aperture, the additive noise level is still very high in the SAR image. In addition, the severe sidelobes from the large-targets are much more challenging. The energy from the main lobes of the large targets spreads to the surrounding area. The error from the measured radar position data causes the leaking of the energy from the main lobes. The limitation of the aperture length is also the significant source of the residual noise in the resulting image.

There are four simulated point targets in the SAR image. The three high amplitude targets are obvious in the image. They are located at the pixel coordinates (60,200), (100,250), and (140,300), respectively. There, is a fourth point target that exists in the SAR image at the coordinate (125,275). This coordinate is at the midpoint between $2^{nd}$ and $3^{rd}$ targets. This fourth target is not visible from the image since its radar cross section (RCS) is so low that its response is masked by the noise floor.

Instead of forming just one baseline SAR image in FIG. 6 using, conventional technique, we first generate many SAR images of the same scene. Each SAR image is formed using a randomly reduced aperture (randomly selecting only 80% of the original aperture to form each image).

A key concept in Block-based Collaborative Filtering is a collective matrix of collocated blocks on SAR images. All collocated image blocks of the randomly reduced aperture SAR images are vectorized to serve as columns of the collective matrix, which is denoted as C. The matrix C (from equation 14) is decomposed through singular value decomposition (SVD) and can be rewritten as follows:

$$C = \begin{pmatrix} u_1 & u_2 & \cdots & u_N \\ | & | & & | \end{pmatrix} \begin{pmatrix} \alpha_1 & & & \\ & \alpha_2 & & \\ & & \ddots & \\ & & & \alpha_N \end{pmatrix} \begin{pmatrix} v_1^T \\ v_2^T \\ \vdots \\ v_N^T \end{pmatrix}$$

where $\alpha_i$ are singular, values, $u_i$ and $v_i^T$ are left singular vectors and right singular vectors, respectively. N is the number of singular values of matrix C.

To understand the principle of this invention, the statistical distribution of the singular values $\alpha_i$ was investigated in two cases:

i. when image blocks are associated with physical objects and ii. when image blocks are associated with noise.

Figure 7:
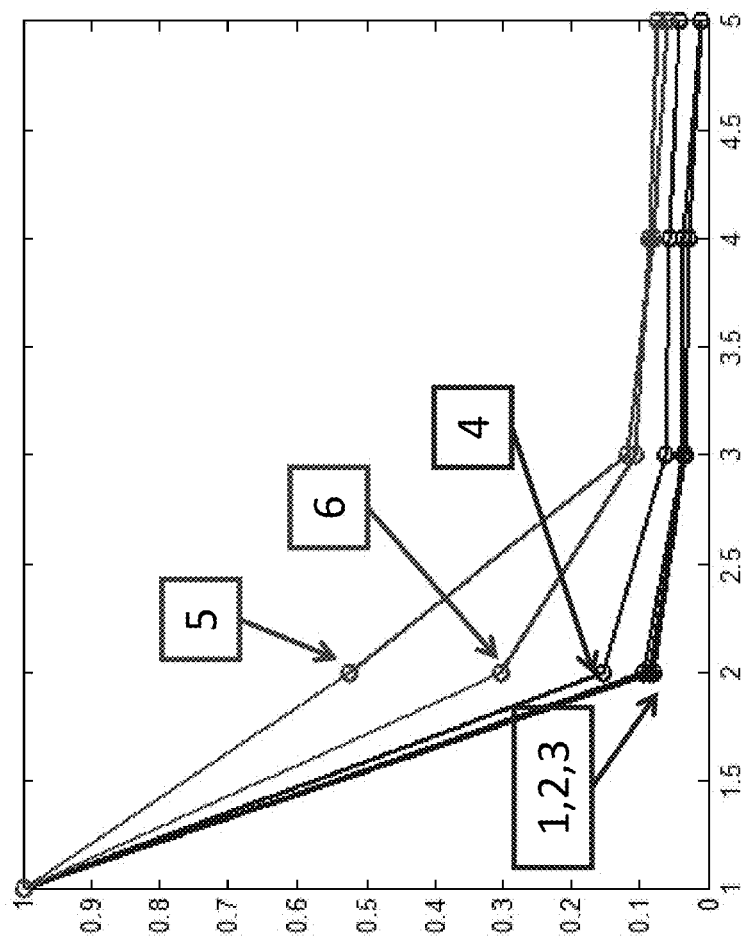
FIG. 7 is a graphical illustration depicting the distribution of those collective matrices singular values; wherein the blocks 1-4 represent targets, the second largest singular value is significantly smaller than the largest singular value; and wherein for a very challenging target (number 4) with amplitude below the noise floor, the ratio between the first singular value and the second singular value is relatively large.

Image blocks were selected around these four targets (blue blocks). Two other image blocks were also selected that contain noise speckles (red blocks number 5 and 6). For each of these six image blocks, a corresponding collective matrix is formed and decomposed via singular value decomposition. FIG. 7 depicts the distribution of those collective matrices' singular values. As can be seen from this figure, with collective matrices of blue blocks that contain targets, the second largest singular value is significantly smaller than the largest singular value. Even with a very challenging target (number 4) with amplitude below the noise floor, the ratio between the first singular value and the second singular value is relatively large. On the other hand, with collective matrices of red blocks that contain no targets, the ratio between the largest and the second largest singular values is much smaller than those for the target groups. This, observation illustrates a way to classify a block that contains targets or not by looking at the ratio between the largest and the second largest singular values of the collective matrix.

The reason why this ratio was large when a block contains target objects was investigated. Consider the case when there is no noise in the SAR image reconstruction. If the SAR image reconstruction was perfect, all randomly reduced SAR images would be exactly the same, and hence, all collocated blocks would also be the same. As a result, the collective matrix would have rank 1, which implies that all of the singular values, except for the largest one, are zero. The ratio between the largest singular value and the second largest one would be infinitely large in this extreme case. In reality, the noise floor always exists, and thus, the second largest singular value is nonzero. The largest singular value represents energy of the signal part while the remaining singular values represent noise energy. Hence, when a block contains real backscatter responses from a target, the ratio between the largest singular value and the second largest one will be large.

Figure 8:
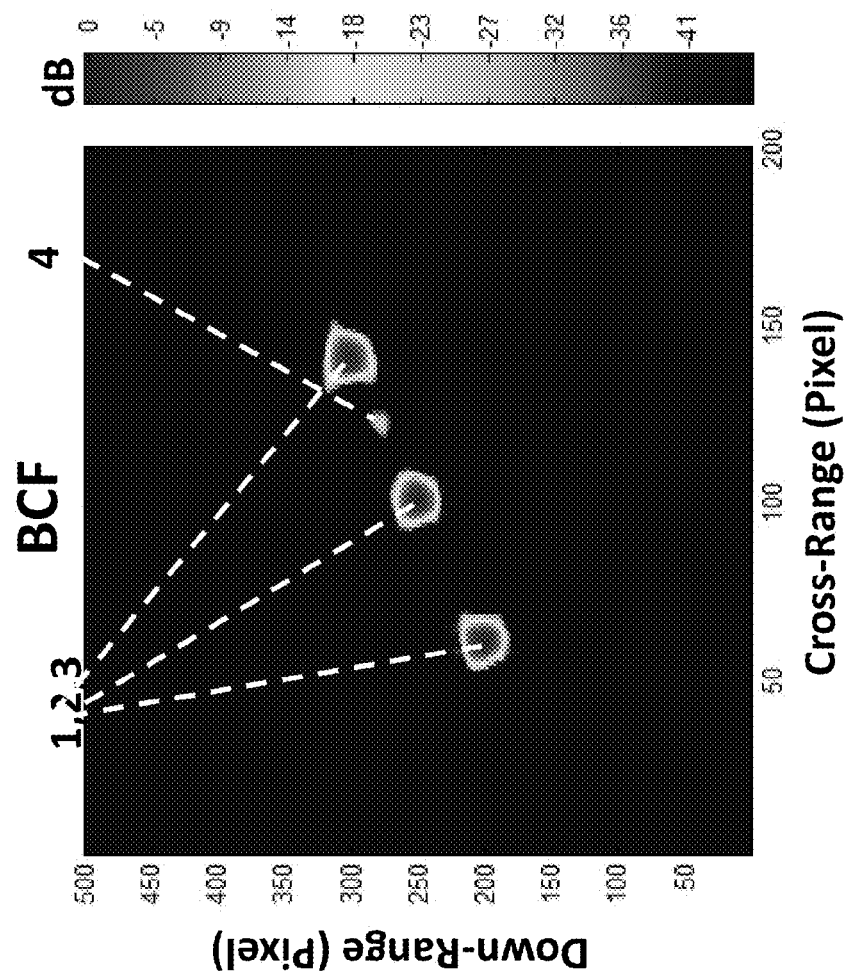
FIG. 8 is an illustration showing the resulting image including all four targets, with target 4 representing a very challenging case for a SAR imaging system. The noise floor generated by the additive white noise and the sidelobes is completely wiped out from the resulting image.
Figure 9:
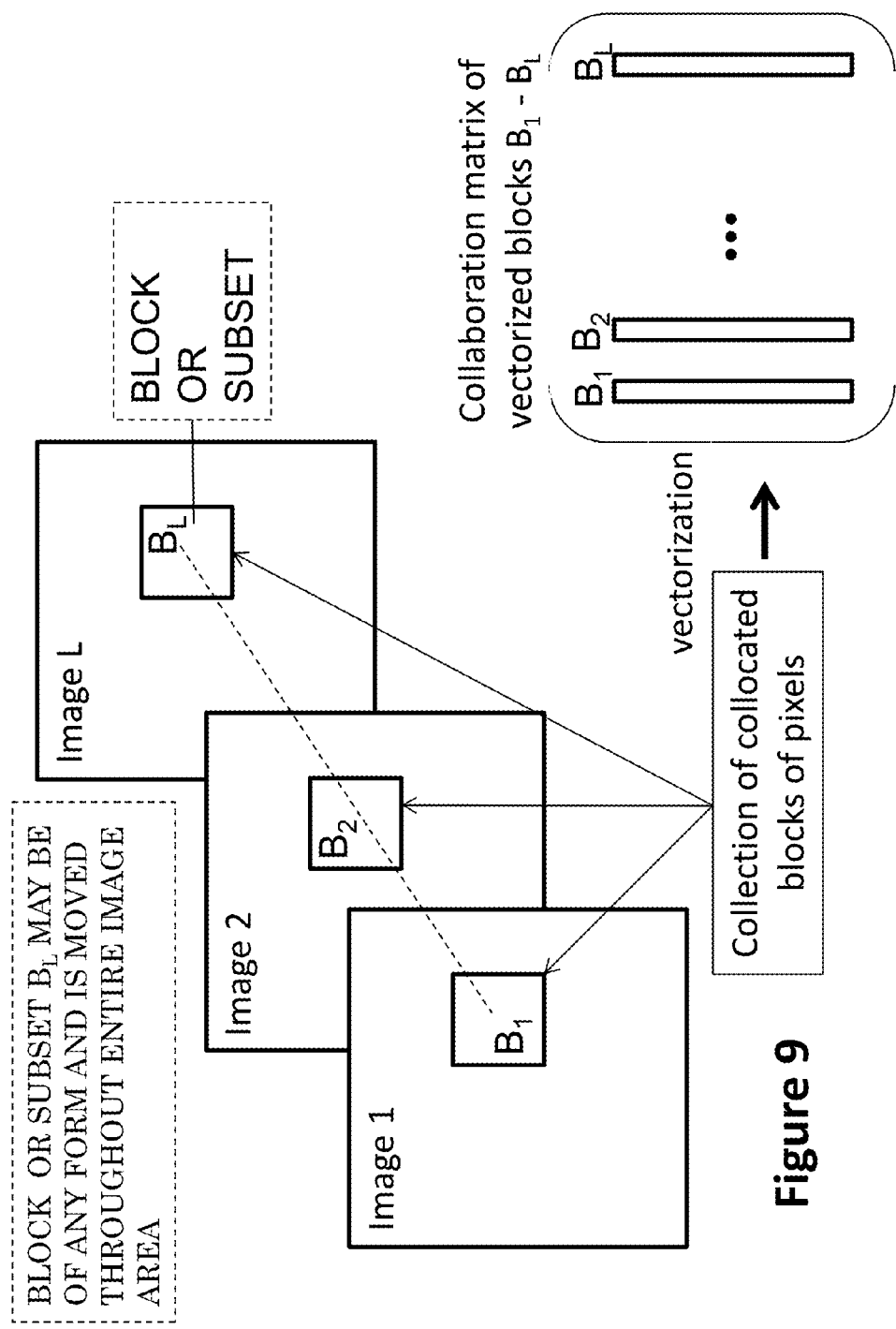
FIG. 9 is a schematic illustration of a representation of the collocated blocks and collaboration matrices.

The resulting image is shown in FIG. 8. This image shows all four targets, including the target 4, which represents one very challenging case for a SAR imaging system. The noise floor generated by the additive white noise and the sidelobes is completely wiped out from the resulting image.

Real Radar Data

Usually, the application of any technique on real data is much more challenging because of many unknown factors in real systems.

FIG. 2A shows the baseline SAR image using the radar data collected in forward-looking mode. The details of the processing algorithm that include the baseline and the Recursive Sidelobe Minimization imaging techniques are reported in Nguyen, L., "Signal and Image Processing Algorithms for the U.S. Army Research Laboratory Ultra-wideband (UWB) Synchronous Impulse Reconstruction (SIRE) Radar," ARL Technical Report, ARL-TR-4784, April 2009. Note that the SAR image is displayed using a very wide dynamic range (50 dB). Although many processing techniques have been applied to produce the SAR image of FIG. 1a, the noise floor is still very high. The targets of interest in this case represent a very challenging scenario, where it would be difficult to reliably detect these small and low amplitude targets in the presence of severe noise and sidelobes. FIG. 2B shows the same SAR image that has been generated using the ARL RECURSIVE SIDELOBE MINIMIZATION technique [4]. Although the noise floor in the SAR image of FIG. 2B has been reduced significantly (more than 10 dB) and this performance was unprecedented at that time, the residual noise level is still visible. This would result in many false alarms that reduce the system's performance. In addition, even though all the targets are detected in this case, the underlying data from Recursive Sidelobe Minimization image only carry magnitude information. Thus, further discrimination features such as frequency analysis would not be possible.

Figure 3:
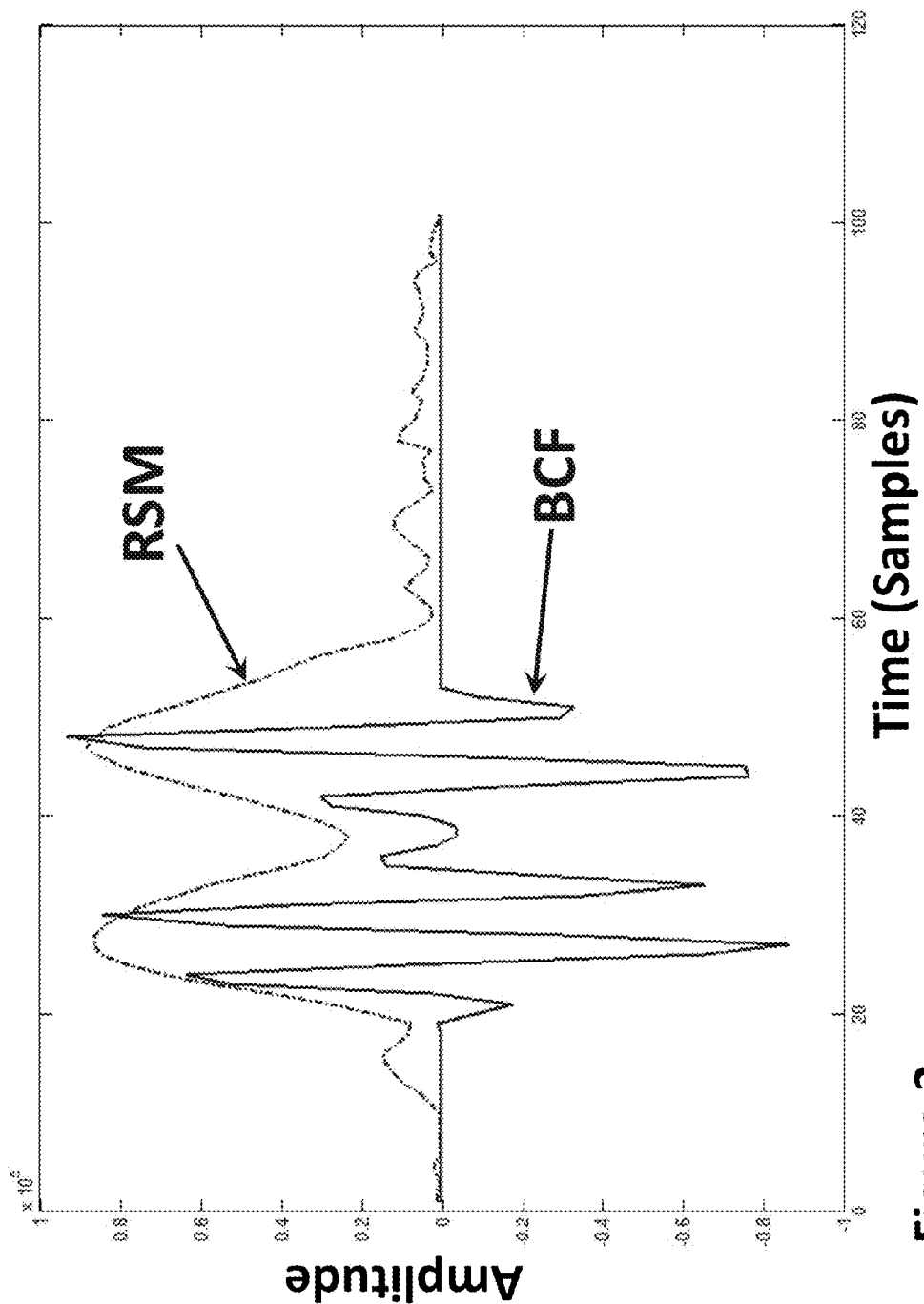
FIG. 3 shows the downrange profiles through a target (located at x=0 m, y=176 m in the images of FIG. 2) from both Recursive Sidelobe Minimization and Block-based collaborative filtering image techniques illustrated in 2B and 2C respectively. The downrange profiles show that while the underlying data from the Recursive Sidelobe Minimization image of FIG. 2B contains only amplitude information, the data from the Block-based collaborative filtering image of FIG. 2C preserves both phase and amplitude information.

The invented technique is applied to the same data to generate the SAR image of FIG. 2C. From FIG. 2C, the SAR image is virtually noise-free. All the targets of interest are detected in the SAR image using the invented technique. FIG. 3 shows the downrange profiles through a target (located at x=0 m, y=176 m in the images of FIG. 2A-2C) from both Recursive Sidelobe Minimization image and the image using the new invented technique. The downrange profiles show that while the underlying data from the Recursive Sidelobe Minimization image (red) contains only amplitude information, the data from the image using the invented technique (blue) preserve both phase and amplitude information, which would be valuable for subsequent target discrimination and classification stages.

Suppression of the multiplicative noise is a much more challenging task since the noise level (sidelobes) is proportional to the size (RCS) of the in-scene targets. Conventional shift-invariant windows have been used to reduce or suppress the sidelobe artifacts at the expense of resolution and reduced SNR. A family of spatially variant apodization techniques (as reported in H. C. Stankwitz, R. J. Dallaire, J. R. Fienup, "Nonlinear Apodization for Sidelobe Control in SAR Imagery," IEEE Trans. on Aerospace and Electronic System, 31, 1, (January 1995)) has been developed to address the sidelobes problem. These spatially variant apodization techniques generate nonlinear imagery (the phase information is not preserved in the resulting imagery). U.S. Pat. No. 7,796,829 (hereby incorporated by reference) discloses a nonlinear imaging technique called RECURSIVE SIDELOBE MINIMIZATION that has been shown to be very robust and significantly reduce the noise level in real SAR imagery by 5-10 dB. U.S. patent application Ser. No. 12/881,364 discloses a method of image formation by pixel classification wherein pixel classification is used to classify each pixel of a sequence of subaperture SAR images into a target class or noise class based on a magnitude of the pixel's normalized standard deviation. If the normalized standard deviation is larger than a threshold, the pixel is classified into the noise class. Otherwise, the pixel is classified into the target class. Despite its superior performance in noise suppression, image formation by pixel classification still has two important features that could be further improved. First, the image formation by pixel classification technique is still based on nonlinear signal processing technique. The pixel classification process (real object/noise) is computed using magnitude data, and thus, the results are also magnitude imagery. This type of imagery is appropriate for applications that only require magnitude information. However, the complex imagery contains much more information (phase and frequency response), which may be the key for target discrimination and classification. Although the target/noise classification information from image formation by pixel classification could be employed in conjunction with the baseline complex imagery to derive the noise reduced complex imagery, this indirect operation could result in the discontinuity in the complex imagery. Second, the pixel classification process image formation by pixel classification depends on the statistics of a single pixel across multiple iterations, thus does not capture the local spatial correlation across many pixels from the same object.

This new invention may significantly improve the performance as well as the robustness of the Recursive Sidelobe Minimization and image formation by pixel classification techniques. The new invention also generates virtually noise-free imagery and providing both amplitude and phase information. The key innovative concept in this invention is collaborative filtering of overlapping blocks of pixels from many realizable sparse aperture SAR images. Blocks of pixels are first classified into either target class (physical objects) or non-target class (noise; sidelobes) based on statistics of singular values of the constructed collaboration matrix. If a block of pixels is classified to be associated with a physical object, its value is computed from the largest singular value of the constructed collaboration matrix and its associated singular vectors. Otherwise, the block is assumed to come from a non-physical object (noise source) and its value is simply zeroed out.

This new invention has two main advantages over Recursive Sidelobe Minimization and image formation by pixel classification techniques. First, the block classification process in block based collaborative filtering is computed using bipolar complex image data, thus the resulting complex image data are directly obtained. This information from the full complex data (instead of magnitude data as in Recursive Sidelobe Minimization or image formation by pixel classification) is the key for target discrimination and classification. Second, block-based collaborative filtering feature in the new invention is more robust than the current state-of-the-art image formation by pixel classification due to the block classification process (using complex data) rather than a single pixel classification process (using magnitude data). Block classification exploits spatial correlation among neighbor pixels better than single pixel classification. Block classification is less susceptible to the threshold parameter as the threshold tends to be more stable over block-level than over pixel-level in image formation by pixel classification. In addition, this invention classifies overlapping blocks and then "denoises" them. The final SAR image is computed from averaging those "denoised" overlapping blocks. A pixel, which belongs to multiple overlapping blocks; is classified and then denoised multiple times. As a result, the new invented technique is less susceptible to pixel misclassification than image formation by pixel classification.

It should be emphasized that the above-described embodiments are merely possible examples of implementations. Many variations and modifications may be made to the above-described embodiments. All such modifications and variations are intended to be included herein within the scope of the disclosure and protected by the following claims. The term "processor" as used herein includes multiprocessors, computers, supercomputers, data processor, laptops, signal processors, personal computers, and/or any component which processes data, including an image generator. The term "image generator" as used herein includes, a processor which generate images and/or any element or component, including components within a processor, which generate images. The term "comparator" as used herein means a component within a processor operative to complete a comparison function or a separate processor or component which compares sets of data in order to determine lesser or equal values.

The present invention may be utilized in radar imaging, magnetic resonance imaging, CAT scans, sonar imaging, acoustical imaging and the like. The resulting benefits are a) extremely high contrast images with the almost noise-free level while preserving all the phase and amplitude information; b) detection of targets with very small amplitudes, especially located in the proximity of other large manmade and natural objects; c) the discrimination between various types of targets; and d) the significant reduction in false alarm rate. These benefits will lead to the implementation of a practical system for detecting very difficult targets, which is the obstacle that most radar systems are facing today. Some examples include 1) the SAR imaging of the ship or building interiors, where the response from targets of interest are much smaller than that from the sidelobes of structure of the ships or buildings; 2) the detection of buried mines and improvised explosive devices (IEDs) along and on the sides of the road, where the responses of the buried mines IEDs are significantly smaller than that of the environment and jamming noise, and other manmade objects, blushes, and trees along the road; and, 3) the detection of difficult targets (abnormal features, tumors) in medical imaging application.

The term "bitmap" is derived from a mapped array of bits, and bitmapped and pixmap refer to the similar concept of a spatially mapped array of pixels. The term "bitmapped" as used herein encompasses pixmap. The term "bitmapped" means a set of bits that represents a graphic image, with each bit or group of bits corresponding to a pixel. As used in the following claims, the term "bitmapped" encompasses all images formed using pixels. For example, all images acquired by digital cameras and camcorders, scanners, and screen capture programs are bitmapped images.

As used in the following claims, the term "processor" means one or more processing units, central processing units, processor cores, microprocessors, digital signal processors, multiprocessors, computers, and/or controllers, which may be connected together or to other circuitry in a manner known to those of ordinary skill in the art.

As used in the foregoing claims, the terminology "area" includes object(s), person(s), setting, place, or scene. For example, "scanning an area" includes scanning an object or objects, person or persons; place or scene. The terminology positional data includes but is not limited to spatial information relating to location.

As used herein, the terminology "target" or "target area," as used in the specification and claims, means stationary or moving target, object, person or persons, scene, vehicle or vehicles and includes object(s), area, person(s), setting, place, or scene.

As used herein, the terminology "mosaic" refers to the formation of an image using the assemblage of small pieces or portions of an image which may or may not be overlapping.

As used herein the terminology "block" includes a rectangle, polygon, circle, oval, square or any shape which defines an area.

As used herein and in the following claims, the terminology "data point" "data point" represents the received signal radar data from each position obtained during an instant or interval in time combined with positional information. The positioning information may, for example, correspond to the transmitting and/or receiving-position or location. The data points may be collected by either an array of elements or a single moving element which receives data at points in time, or the combination of both; e.g., a physical array of elements with the elements moving over increments of time. The data collection may be sporadic or at specific intervals of time. As exemplified in FIG. 6, data points are obtained using an array of receiving elements which receive data incrementally. The data points are arranged to form an aperture.

As used herein, the term "aperture" means the information or data components used to form an image; which may be for example, an array of data points developed from a scanned area, target or scene which can be used to form an image. As an example, in the apertures depicted in FIG. 6, each column represents an interval during which the 1-k elements receive data; each data point representing the image data from the signal received combined with the coordinates of the receiving element.

As used herein and in the following claims, the terminology "aperture" refers to the collection of K data records along the path (or aperture) of travel of the emitting radar or signal source. In general, the aperture could be a line, a curve, a circle, or any arbitrary shape. The receiving element k from the aperture is located at the coordinate $(x_R(k), y_R(k), z_R(k))$. For bistatic radar (the transmitting antenna is separate from the receiving antenna) the transmitting element k from the aperture is located at the coordinate $(x_T(k), y_T(k), z_T(k))$. For monostatic radar (the transmitting antenna is the same as or co-located with the receiving antenna) the transmitting coordinates $(x_T(k), y_T(k), z_T(k))$ would be the same as the receiving coordinates $(x_R(k), y_R(k), z_R(k))$. Since the monostatic radar case is a special case of the bistatic radar configuration, the algorithm described here is applicable for both configurations. The returned radar signal at this receiving element k is $s_k(t)$. In order to form an image from the area of interest, we form an imaging grid that consists of N image pixels. Each pixel $P_i$ from the imaging grid is located at coordinate $(x_p(i), y_p(i), z_p(i))$. The imaging grid is usually defined as a 2-D rectangular shape. In general, however, the image grid could be arbitrary. For example, a 3-D imaging grid would be formed for ground penetration radar to detect targets and structures buried underground. Another example is 3-D image of inside human body.

After the data points are established in an aperture (or array), as, for example, diagrammatically shown in FIG. 6, a substantial portion of data points are removed from the original aperture (array of data points) to form a "subarray" or "subaperture." Conversely, the "subarray" or "subaperture" may be formed by the selection of data points within the original aperture.

The terminology "singular value decomposition (SVD)" as defined in Wikipedia means the factorization of a real or complex matrix. Formally, the singular value decomposition of an m×n real or complex matrix M is a factorization of the form $$M=U\Sigma V^*,$$

where U is an m×m real or complex unitary matrix, Σ is an m×n rectangular diagonal matrix with nonnegative real numbers on the diagonal, and V*(the conjugate transpose of V) is an n×n real or complex unitary matrix. The diagonal entries $\Sigma_{i,i}$ of Σ are known as the singular values of M. The m columns of U and the n columns of V are called the left singular vectors and right singular vectors of M, respectively. The singular value decomposition and the eigendecomposition are closely related. Namely (1) The left singular vectors of M are eigenvectors of, (2) The right singular vectors of M are eigenvectors of M*M and (3) The non-zero singular values of M (found on the diagonal entries of J are the square roots of the non-zero eigenvalues of both M*M and M M*. As an example, suppose Suppose M is an m×n matrix whose entries come from the field K, which is either the field of real numbers or the field of complex numbers. Then there exists a factorization of the form M=UΣV*.

where U is an m×m real or complex unitary matrix, Σ is an m×n rectangular diagonal matrix with nonnegative real numbers on the diagonal (zeroes otherwise), and V* (the conjugate transpose of V) is an n×n real or complex unitary, matrix. The diagonal entries Σi,i of Σ are known as the singular values of M. The m columns of U and the n columns of V are called the left singular vectors and right singular vectors of M, respectively.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method for generating enhanced images of a target area using projection data obtained using electromagnetic radiation, the method comprising:
   transmitting electromagnetic radiation using a transmitter;
   receiving electromagnetic radiation using a receiver;
   using at least one processor, forming an initial aperture of data points containing positional information of the transmitter and receiver of the electromagnetic radiation and an associated data record;
   randomly removing data points from the initial aperture to form subapertures with randomly missing data points;
   creating a subset of data points from each of the plurality of subapertures, the subsets containing data points containing image data for portions of the target area which are the same or overlapping;
   comparing the subsets of data points to determine variations in the data points indicative of transient data;
   based upon the comparison between overlapping subsets of image data, determining whether the subsets of data points comprise image data relating to physical objects or noise.

2. The method of claim 1 further comprising the step of forming a collaboration matrix and wherein the subapertures of data points are divided into a plurality of overlapping subsets of data points, and wherein the subsets of data points are converted to a column vector within the collaboration matrix, and wherein the collaboration matrix is decomposed using the standard singular value decomposition method wherein the collaboration matrix C is decomposed $$C = \begin{pmatrix} u_1 & u_2 & \cdots & u_M \\ | & | & & | \end{pmatrix} \begin{pmatrix} \alpha_1 & & & \\ & \alpha_2 & & \\ & & \ddots & \\ & & & \alpha_N \end{pmatrix} \begin{pmatrix} v_1^T \\ v_2^T \\ \vdots \\ v_N^T \end{pmatrix}$$

where U matrix is an M×M real or complex unitary matrix, α matrix is an M×N rectangular diagonal matrix with nonnegative real numbers on the diagonal, and $V^T$ (the conjugate transpose of V) is an N×N real or complex unitary, matrix, and wherein if the ratio of $\alpha_1/\alpha_2$ is at or above threshold value the corresponding subset of data points is used to form the enhanced image and if the ratio is below the threshold value, the corresponding subset of data is determined not to relate to physical objects and is set to zero or discarded.

3. The method of claim 1 wherein if the subsets of data points are determined to relate to physical objects, they are used to form a composite mosaic image and if the subsets of data are found to contain transient data, they are discarded.

4. The method of claim 1 wherein the image is formed from projection data formed using electromagnetic radiation that irradiates an area, the electromagnetic radiation being transmitted by at least one transmitter and received by at least one receiver, and wherein the plurality of image frames of an area comprise data points forming an initial aperture, each data point comprising positional information of the receiving input, positional information of the transmitting output, and the data record.

5. The method of claim 2 wherein the each initial aperture comprises a set of data points containing image data for a generating an image of a predetermined area and wherein the step of randomly removing data points from the initial aperture comprises randomly removing data points so as to form a subaperture with data points removed at random locations, the subapertures varying from one another in that although some have common data points, other subapertures varying in that different data points have been randomly removed.

6. The method of claim 1 wherein subsets of data points within the subapertures represent image data from the same or overlapping portions of the target area, and wherein the subsets of data are compared for variances, and wherein the subsets with variances are discarded and the subsets substantially without variances are mosaically combined to form an enhanced image, and wherein the subsets of data points retain the positional data of the receiver and transmitter as well as the associated data record so as to enable creation of an enhanced image while retaining the vector data format containing the positional data of the receiver and transmitter and associated data record.

7. The method of claim 6 wherein the comparing the subsets of data points comprises forming collaboration matrices from the subsets of data and using statistics compiled using singular values calculated from the constructed collaboration matrices to determine whether or not the subset should be used to form the enhanced image.

8. The method of claim 7 wherein if a subset is classified to be associated with a physical object, its value is computed from the largest singular value of the constructed collaboration matrix and its associated singular vectors; otherwise, the subset is assumed to come from a non-physical source or noise source and it is given a zero value.

9. The method of claim 1 wherein the method is used to suppress both additive and multiplicative noise, and may be utilized to generate bipolar complex SAR imagery that is substantially noise-free.

10. A system for generating enhanced images of a target area using projection data obtained using electromagnetic radiation, the system comprising:
at least one transmitter configured to transmit electromagnetic radiation, at least one receiver configured to receive electromagnetic radiation;
at least one processor operatively connected to the at least one receiver, the at least one processor having at least one input for inputting the projection data and at least one output for outputting enhanced image data, the at least one processor operating to perform the following:
forming an initial aperture of data points containing positional information of the transmitter and receiver of the electromagnetic radiation and an associated data record;
randomly removing data points from the initial aperture to form subapertures with randomly missing data points;
creating a subset of data points from each of the plurality of subapertures, the subsets containing data points containing image data for portions of the target area which are the same or overlapping;
comparing the subsets of data points to determine variations in the data points indicative of transient data;
based upon the comparison between overlapping subsets of image data, determining whether the subsets of data points comprise image data relating to physical objects or noise.

11. The system of claim 10 wherein the at least one processor operates to form a collaboration matrix, and wherein the subapertures of data points created by the at least one processor randomly removing data points from the initial aperture are divided by the at least one processor into a plurality of overlapping subsets of data points, and wherein the subsets of data points are converted by the at least one processor to a column vector within the collaboration matrix, and wherein the collaboration matrix is decomposed using the standard singular value decomposition method, and wherein the ratio of the first and second of the plurality of singular values is used by the at least one processor to determine a threshold value, and wherein if the ratio is at or above threshold value the corresponding subset of data points is used to form the enhanced image and if the ratio is below the threshold value, the corresponding subset of data is determined not to relate to physical objects and is set to zero or discarded.

12. The system of claim 10 wherein if the subsets of data points are determined by the at least one processor to relate to physical objects, the subsets are used by the at least one processor to form a composite mosaic and the at least one processor discards or sets to zero subsets of data points that are found to contain transient data.

13. The system of claim 10 wherein the system is a synthetic aperture radar system, and wherein the at least one processor operates to form the image from projection data formed using electromagnetic radiation that irradiates an area, the electromagnetic radiation being transmitted by at least one transmitter and received by at least one receiver, and wherein the plurality of image frames of an area comprise data points forming an initial aperture; each data point comprising positional information of the receiving input, positional information of the transmitting output, and the data record.

14. The system of claim 10 wherein the initial aperture comprises a set of data points containing image data for generating an image of a predetermined area and wherein the at least one processor operates to randomly remove data points from the initial aperture so as to form a subaperture with data points removed at random locations, the subapertures varying from one another in that although some have common data points, other subapertures varying in that different data points have been randomly removed.

15. The system of claim 13 wherein subsets of data points within the subapertures represent image data from the same or overlapping portions of the target area, and wherein the subsets of data are compared by the at least one processor for variances, and wherein the subsets above a predetermined threshold of variances are discarded and the subsets below the predetermined threshold are mosaically combined to formed an enhanced image, and wherein the subsets of data points retain the positional data of the receiver and transmitter as well as the associated data record so as to enable creation of an enhanced image while retaining the vector data format containing the positional data of the receiver and transmitter and associated data record.

16. The system of claim 15 wherein the comparing of the subsets of data points comprises forming collaboration matrices from the subsets of data and using statistics compiled using singular values calculated from the constructed collaboration matrices to determine whether or not the subset should be used to form the enhanced image.

17. The system of claim 16 wherein if a subset is classified to be associated with a physical object, the value of the subset is computed from the largest singular value of the constructed collaboration matrix and its associated singular vectors; otherwise, the subset is assumed to come from a non-physical source or noise source and is given a zero value.

18. The system of claim 10 wherein the at least one processor operates to suppress both additive and multiplicative noise, and wherein the system may be utilized to generate bipolar complex SAR imagery that is substantially noise-free.

* * * * *